United States Patent [19]

Adam

[11] Patent Number: 4,992,569
[45] Date of Patent: Feb. 12, 1991

[54] DICYANOBENZANTHRONE COMPOUNDS

[75] Inventor: Jean-Marie Adam, Rosenau, France

[73] Assignee: Ciba-Geigy Corporation, Ardsley, N.Y.

[21] Appl. No.: 360,579

[22] Filed: Jun. 1, 1989

[30] Foreign Application Priority Data

Jun. 6, 1988 [CH] Switzerland .......................... 2136/88

[51] Int. Cl.$^5$ .............................................. C07C 50/38
[52] U.S. Cl. .................................................... 552/287
[58] Field of Search ......................................... 552/287

[56] References Cited

U.S. PATENT DOCUMENTS 4,801,406  1/1989  Schwander .......................... 552/287

*Primary Examiner*—Richard L. Raymond
*Assistant Examiner*—Raymond Covington
*Attorney, Agent, or Firm*—Edward McC. Roberts

[57] ABSTRACT

The dyes of the formula (1) as defined in claim 1 are suitable in particular for the dyeing of polyester textile material by the exhaust process.

11 Claims, No Drawings

DICYANOBENZANTHRONE COMPOUNDS

The present invention relates to novel dicyanobenzanthrone compounds, processes for their preparation and their use as dyes for the dyeing and printing of semi-synthetic or synthetic hydrophobic material.

The novel dicyanobenzanthrone compounds have the formula

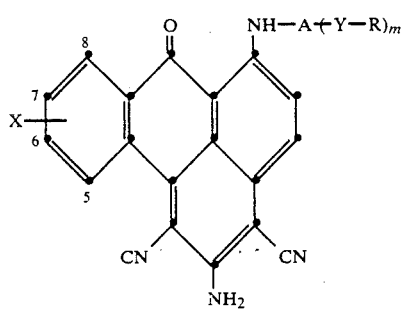

in which X is hydrogen, halogen, nitro, $NH_2$, Y is —O— or —S—, A is a bridge member, m is 1, 2 or 3, R is hydrogen or a radical

in which $R^1$ is a substituted or unsubstituted alkyl or aryl group.

A halogen X can be, for example, bromine or, in particular, chlorine. The halogen can be in the 6- or 7-position.

However, preferably X is hydrogen.

Y is —S— or preferably —O—.

Dyes of the formula (1) in which R is a radical

represent a preferred embodiment of the present invention.

An alkyl radical $R^1$ can be a substituted or unsubstituted, unbranched or branched alkyl radical or a cycloalkyl radical. The cycloalkyl radical preferably has 5 to 8 C atoms, the open-chain alkyl radical preferably 1 to 8 C atoms.

Examples of suitable unbranched or branched open-chain alkyl radicals are: methyl, ethyl, n- and iso-propyl, n-, sec- or tert-butyl, n- and iso-pentyl, n- and iso-hexyl or 2-ethylhexyl.

These alkyl radicals can be monosubstituted or polysubstituted, for example by $C_1$–$C_4$ alkoxy, phenyl or phenoxy, in which the phenyl group in the two lastmentioned radicals can be substituted, for example, by $C_1$–$C_4$ alkyl, $C_1$–$C_4$ alkoxy or phenoxy. Suitable radicals of this type are, for example: ethoxymethyl, benzyl, 1-phenylethyl, 2-phenylethyl, 1-methyl-2-phenylethyl, 1-iso-butyl-3-phenylpropyl, 1,5-diphenylpent-3-yl or 1-methyl-2-phenoxyethyl.

A substituted or unsubstituted $C_5$–$C_8$ cycloalkyl radical $R^1$ is in particular a cyclopentyl or cyclohexyl radical; suitable substituents are in particular $C_1$–$C_4$ alkyl groups, especially the $CH_3$ group.

An aryl radical $R^1$ is in particular a naphthyl radical and especially a phenyl radical, it being possible for these radicals to be substituted, for example by $C_1$–$C_4$ alkyl, $C_1$–$C_4$ alkoxy, halogen, such as fluorine, chlorine or bromine, nitro, $C_1$–$C_4$ alkylcarbonylamino or $C_1$–$C_4$ alkoxycarbonyl.

IN preferred dyes of the formula (1), $R^1$ is $C_1$–$C_6$ alkyl which is unsubstituted or substituted by phenyl or phenoxy, it being possible for the phenyl group in the two lastmentioned radicals to be substituted by $C_1$–$C_4$ alkyl, $C_1$–$C_4$ alkoxy or phenoxy, or is phenyl which is unsubstituted or substituted by $C_1$–$C_4$ alkyl.

Particular preference is given to dyes of the formula (1) in which $R^1$ is $C_1$–$C_3$ alkyl or phenyl.

Preferred dyes of the formula (1) contain 1 or 2, in particular 1 radical —Y—R.

The bridge member A is an aliphatic, aromatic or araliphatic radical to which 1 to 3 groups —Y—R are bound.

Examples of suitable aliphatic radicals are straight-chain or branched $C_2$–$C_8$ alkylene or cyclic $C_5$–$C_8$ alkylene, for example ethylene, 1,3- or 1,2-propylene, 1,4-, 2,3- or 2,4-butylene, 2-methyl-1,3-propylene, 2-methyl-2,4-pentylene, 2,2-dimethyl-1,3-propylene, 1,6- or 2,5-hexylene, 1-methyl-2,6-heptylene, and 1,3- or 1,4-cyclohexylene. Examples of suitable aromatic radicals are 1,3- or 1,4-phenylene, and 1,4- or 1,5-naphthylene.

Examples of suitable araliphatic radicals are: o-, m- and p-phenylenemethylene, o-, m- and p-phenylene-2-ethylene, phenyl-1,2-ethylene, 1-phenyl-1,3-propylene, 2-phenyl-1,3-propylene, 1-phenyl-1,2-propylene and 1-phenyl-2,3-propylene, it being possible for the radicals —Y—R to be bound to the aliphatic and/or aromatic moiety.

Preferably, A is a $C_2$–$C_5$ alkylene radical or a phenylene-$C_2$–$C_5$ alkylene radical, particularly preferably a propylene, butylene, phenylethylene or phenylenepropylene radical.

By virtue of their good colouristic properties, especially their good exhaust properties from an aqueous dye bath, dyes of the formula

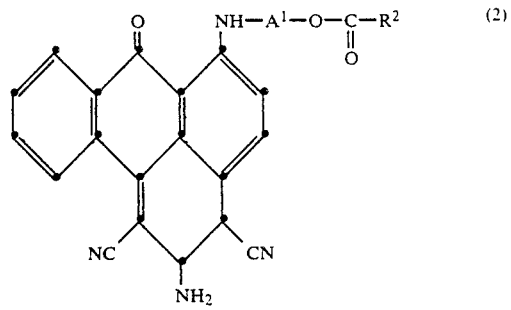

in which $A^1$ is a $C_2$–$C_5$ alkylene radical or a phenyl-$C_2$–$C_5$ alkylene radical and $R^2$ is $C_1$–$C_3$ alkyl or phenyl are particularly preferred.

The novel dicyanobenzanthrone compounds of the formula (1) are obtained, for example, by reacting a substituted aminoanthraquinone of the formula

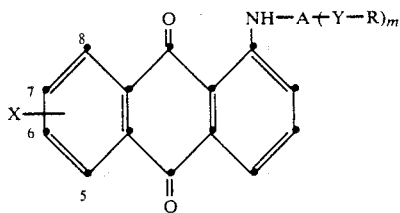
(3)

in which X, Y, A, m and R are as defined in formula (1) with malodinitrile in an inert solvent in the presence of titanium tetrachloride and a tertiary amine.

Examples of suitable inert solvents are aliphatic hydrocarbons such as n-pentane, n-hexane or n-heptane, chlorinated hydrocarbons such as methylene chloride, chloroform or tetrachloromethane, ethers, for example diethyl ether, or aromatic compounds, for example nitrobenzene or halogenated benzenes. Preferably, a chlorinated hydrocarbon is used, in particular methylene chloride.

The tertiary amines used are, for example, aliphatic amines such as triethylamine or in particular aromatic amines, for example picoline or pyridine.

At least 2 moles, but preferably 2.2 to 3 moles, of malodinitrile are used per mole of anthraquinone compound of the formula (3). A larger excess is in general not detrimental but neither advantageous.

The amount of titanium tetrachloride is preferably 2 to 10 moles, in particular 3 to 6 moles, per mole of anthraquinone compound of the formula (3).

The tertiary amine is used at least in an amount which is necessary for binding the acid formed. However, in general an excess, preferably 2 to 6 mole per mole of titanium tetrachloride, is used.

The reaction temperature is in general about between −10° and +60° C., preferably between 0° and 25° C.

After the reaction is completed, the dye is isolated in a manner known per se, for example by distilling off the volatile components of the reaction mixture, treating the residue with dilute aqueous acid, filtering off the product and, if desired, recrystallizing it.

Dyes of the formula (1) in which R is a radical

can also be obtained by first reacting a compound of the formula (3) in which R is hydrogen to the dicyanobenzanthrone compound, as described in formula (3), and subsequently acylating this compound in a conventional manner.

The compounds of the formula (1) according to the invention can be used as dyes for the dyeing and printing of semisynthetic and, especially, synthetic hydrophobic fiber materials, in particular textile materials. Mixed fabric textile materials containing this type of semisynthetic or synthetic hydrophobic textile materials can also be dyed or printed by means of the compounds according to the invention.

Suitable semisynthetic textile materials are in particular secondary cellulose acetate and cellulose triacetate.

Synthetic hydrophobic textile materials consist in particular of linear aromatic polyesters, for example those from terephthalic acid and glycols, in particular ethylene glycol or condensation products of terephthalic acid and 1,4-bis(hydroxymethyl)hexahydrobenzene; from polycarbonates, for example those from α,α-dimethyl-4,4′-dihydroxydiphenylmethane and phosgene, and from fibers based on polyvinyl chloride and polyamide.

The compounds according to the invention are applied to the textile materials by known dyeing procedures. For example, polyester fiber materials are dyed in the exhaust process from an aqueous dispersion in the presence of customary anionic or nonionic dispersants and, if necessary, customary swelling agents (carriers) at temperatures between 80° and 140° C. Secondary cellulose acetate is preferably dyed between about 65° to 85° C. and cellulose triacetate at temperatures of up to 115° C. The novel dyes produce only little staining, if any, on wool and cotton when present in the dye bath at the same time, i.e. they have very good reserve, so that they are also very suitable for the dyeing of the polyester component of polyester/wool and polyester/cellulose fiber mixtures.

EP-A No. 238,443 has already disclosed dicyanobenzanthrone compounds. These differ from the compounds of the formula (1) according to the invention by the substituted amino groups. EP-A No. 238,443 has not disclosed any compounds having a radical —Y—R in accordance with the present invention.

Compared to the known dyes, the dyes according to the invention containing at least one group —Y—R are distinguished by substantially improved exhaustion properties on polyester material. While the known dyes are only suitable under certain conditions for the aqueous exhaust process, in particular for dyeing in deep shades, the dyes according to the invention give very good fixation yields even in the exhaust process.

The dyes of the formula (1) according to the invention are also suitable for dyeing by the Thermosol process and for textile printing.

The textile material mentioned can be present in a wide range of processing forms, for example as fiber, threads or non-wovens, as wovens or knitted fabric.

It is advantageous to convert the dyes according to the invention into a dye preparation before they are used. This is done by milling the dye, until its particle size is on average between 0.01 and 10 micrometers. The milling can take place in the presence of dispersing agents. For example, the dry dye is milled together with a dispersing agent or is kneaded in the form of a paste with a dispersing agent and then dried in vacuo or by spraying. After the addition of water, the preparations thus obtained can be used for dyeing and printing.

For printing, the customary thickeners are used, for example modified or unmodified natural products, for example alginates, British gum, gum arabic, crystal gum, locust bean gum, tragacanth, carboxymethylcellulose, hydroxyethylcellulose, starch or synthetic products, for example polyacrylamides, polyacrylic acid or copolymers thereof or polyvinyl alcohols.

The dyes according to the invention are virtually insensitive to carriers and give the materials mentioned, in particular the polyester material, level bluish red to violet hues, which have very good wear fastness properties, in particular good light fastness, good sublimation fastness, fastness to dry heat thermosetting and pleating, chlorine and wet fastness, such as water, perspiration and wash fastness; the dyeings are also distinguished by good pH stability and very good rub fastness. In addition, very strong dyeings are obtained, which do not show "catalytic fading".

The dyes according to the invention are also very suitable for the preparation of mixed shades together with other dyes. It is, of course, also possible to use mixtures of the dyes according to the invention with each other.

The novel dyes are also suitable for the dyeing and pigmenting of high-molecular-weight organic materials, for example of cellulose ethers and cellulose esters, such as ethylcellulose, nitrocellulose, cellulose acetate, cellulose butyrate, natural resins or synthetic resins, such as polymerization resins or condensation resins, for example aminoplastic resins, in particular urea/ and melamine/formaldehyde resins, alkyd resins, phenolic resins, polycarbonates, polyolefins, such as polystyrene, polyvinyl chloride, polyethylene, polypropylene, polyacrylonitrile, polyacrylic esters, polyamides, polyurethanes or polyesters, rubber, casein, silicone and silicone resins, individually or in mixtures.

It makes no difference whether the high-molecular-weight compounds mentioned are present as plastic materials, melts or in the form of spinning solutions, lacquers, paints or printing inks. Depending on the area of application, it may be advantageous to use the novel dyes as toners or in the form of preparations.

The dyes can be used in the form in which they are obtained in the synthesis. In lightly milled form, they give opaque colourings. However, they can also be subjected to intensive milling, after which they give transparent colourings, for example a strong metallic effect coating.

Thermoplastics which can be dyed in the melt by means of the novel dyes of the formula (1) are polystyrene and its mixed polymers, polycarbonates, polyamides, but in particular linear polyesters. Especially suitable linear polyesters are those which are obtained by polycondensation of terephthalic acid or esters thereof with glycols of the formula HO—(CH$_2$)$_n$—OH in which n is the number 2-10 or with 1,4-di(hydroxymethyl)cyclohexane or by polycondensation of glycol ethers of hydroxybenzoic acids, for example p-($\beta$-hydroxyethoxy)benzoic acid. The term linear polyester also comprises copolyesters which have been obtained by partial replacement of terephthalic acid by another dicarboxylic acid or a hydroxycarboxylic acid and/or by partial replacement of glycol by another diol.

However, polyethylene terephthalates are of particular interest.

The linear polyesters to be dyed are advantageously intimately mixed with the dye in the form of powders, chips or granules. This can be done, for example, by dusting the polyester particles with the finely divided dry dye powder or by treating the polyester particles with a solution or suspension of the dye in an organic solvent, followed by removal of the solvent.

Finally, the substance to be dyed can also be added directly to the melted polyester or even before or during the polycondensation of the polyethylene terephthalate.

The ratio of dye to polyester can vary within wide limits, depending on the colour strength desired. In general, it is advisable to use 0.01–2 parts of the dye for 100 parts of polyester.

The polyester particles thus treated are melted in an extruder by known processes and extruded to give articles, especially sheets or fibers or cast to give boards.

This gives articles having level and intensely bluish red to violet dyeings of high light and migration fastness. The dyed fibers obtained according to the process are furthermore distinguished by excellent wet and dry cleaning fastness properties.

A particular advantage of the dyes used according to the invention is that they are soluble in the polyester melt and withstand high temperatures of up to 300° C. without decomposition, so that considerably clearer dyeings are obtained than by using insoluble pigments.

The abovementioned uses of the dicyanobenzanthrone compounds of the formula (1) according to the invention as well as a process for the dyeing or printing of semisynthetic or synthetic fiber material, in particular textile material, which consists in applying one or more compounds of the formula (1) to the material mentioned or incorporating these therein are also provided by the present invention. The hydrophobic fiber material mentioned is preferably textile polyester material. Further substrates which can be treated by means of the process according to the invention and preferred process conditions can be found above in the more detailed explanation of the use of the compounds according to the invention.

The hydrophobic fiber material, preferably polyester textile material, which is dyed or printed by means of the process mentioned is also provided by the invention.

The examples which follow illustrate the invention in more detail without limiting it thereto. Parts and percentages are by weight, unless stated otherwise. The temperatures given are in degrees Celsius.

EXAMPLE 1

23 ml of titanium tetrachloride are added dropwise at a temperature of 0°–5° with vigorous stirring over a period of 30 minutes to a mixture consisting of 11.8 g of the compound of the formula

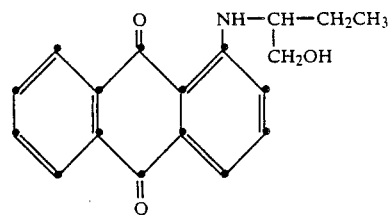

7 g of malodinitrile and 250 ml of methylene chloride, and 70 ml of pyridine are then added dropwise at the same temperature over a period of 30 minutes. Stirring of the mixture is then continued for another 2 hours, in the course of which the temperature is allowed to rise to 20°. The volatile components are then removed in a rotary evaporator in vacuo, the residue is treated with 200 ml of 2 N HCl, the product is filtered off and washed with 2 N HCl. The product on the filter is then washed with water until the filtrate remains neutral and then with methanol to remove brown by-products. The product is dried and then recrystallized from 10 parts of ethylcellosolve. The dye is obtained as a dark violet powder.

The dye has the formula

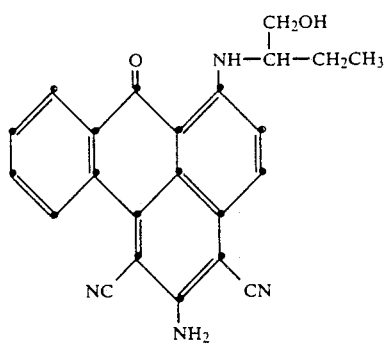

which is in agreement with the elemental analysis, mass spectrum and nuclear proton resonance spectrum.

When applied to polyester as a disperse dye by conventional exhaust processes, brilliant bluish red dyeings having good fastness properties, in particular good sublimation and light fastness properties, in combination with a high degree of exhaustion are obtained.

EXAMPLES 2–23

The same procedure is repeated, except that 1-alkylamino-, 1-aralkylamino- or arylamino-anthraquinones which are substituted by OH groups are used, to give the dyes listed in the table below, which have similar properties and dye polyester in bluish red shades.

TABLE 1

| Example | R |
|---|---|
| 2 | —CH₂—CH(OH)—CH₂OH |
| 3 | —CH₂—CH(OH)—CH₃ |
| 4 | —C₆H₄—CH₂OH (para) |
| 5 | —C₆H₄—CH₂OH (meta) |

TABLE 1-continued

| Example | R |
|---|---|
| 6 | —C₆H₄—CH₂OH |
| 7 | —CH₂CH₂—C₆H₄—OH |
| 8 | —CH₂CH₂—C₆H₃(OH)₂ |
| 9 | —CH₂CH₂OH |
| 10 | —CH(C₂H₅)CH₂OH |
| 11 | —CH₂CH₂CH₂CH₂OH |
| 12 | —C₆H₄—OH |
| 13 | —CH₂—CH(OH)—C₆H₅ |
| 14 | —CH(CH₂OH)—C₆H₅ |
| 15 | —CH(CH₃)—CH₂CH₂CH₂—C(CH₃)₂—OH |
| 16 | —CH(CH₂OH)—CH(CH₃)₂ |

TABLE 1-continued

[Structure: anthraquinone-like with O, NH—R, NC, CN, NH₂ substituents]

| Example | R |
|---|---|
| 17 | —C(CH₃)(CH₂OH)(CH₂OH) |
| 18 | —C(CH₃)(CH₃)(CH₂OH) |
| 19 | —CH(OH)—CH(CH₂OH)—C₆H₅ |
| 20 | —CH(CH₃)—CH(OH)—C₆H₅ |
| 21 | —CH(CH₂OH)—CH₂—C₆H₅ |
| 22 | —CH(CH₃)—CH₂OH |
| 23 | —CH₂CH₂CH₂—OH |

EXAMPLE 24

3.6 g of the dye according to Example 1 are dissolved in 50 ml of pyridine, and 1.8 ml of acetic anhydride are added at 20° C. Stirring at 20° C. is continued for 15 hours, and the mixture is diluted with 50 ml of water.

The precipitated dye of the formula

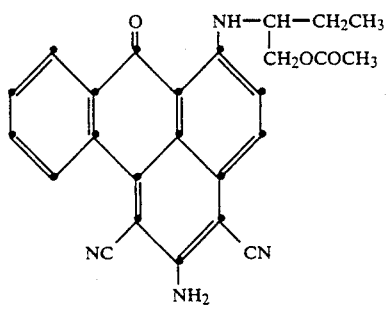

is filtered off with suction, washed with water and dried.

When applied to polyester as a disperse dye by conventional processes, brilliant bluish red dyeings having good fastness properties, in particular good sublimation and light fastness properties, and a very good degree of exhaustion are obtained.

The procedure of the example above is repeated, using propionic or benzoic anhydride instead of acetic anhydride, to give similar dyes having similarly good properties.

EXAMPLES 25-90

The procedure of the example above is repeated, using the corresponding 1-alkylamino- or 1-aryl- or 1-aralkylaminoanthraquinones which are substituted by acyloxy groups, to give the dyes listed in the table below, which have similar properties and dye polyester in the hue given.

TABLE 2

[Structure: anthraquinone-like with O, NH—R, NC, CN, NH₂ substituents]

| Example | R (Ac = C(=O)—CH₃) | Shade on polyester |
|---|---|---|
| 25 | —CH₂—CH(OAc)—CH₂—OAc | bluish-red |
| 26 | —CH₂—CH(OAc)—CH₃ | bluish-red |
| 27 | —C₆H₄—CH₂OAc | red-violet |
| 28 | —C₆H₄—CH₂OAc | red-violet |
| 29 | —C₆H₄—CH₂OAc | red-violet |
| 30 | —CH₂CH₂—C₆H₄—OAc | bluish-red |

TABLE 2-continued

[Structure: anthracene-based chromophore with NH—R, O, NC, CN, NH2 substituents]

| Example | R (Ac = C(=O)—CH₃) | Shade on polyester |
|---------|---------------------|---------------------|
| 31 | —CH₂CH₂—(phenyl with OAc, OAc) | bluish-red |
| 32 | —CH₂CH₂OAc | bluish-red |
| 33 | —CH(C₂H₅)CH₂OAc | bluish-red |
| 34 | —CH₂CH₂CH₂CH₂OAc | bluish-red |
| 35 | —(cyclohexyl with H, OAc) | bluish-red |
| 36 | —CH₂—CH(OAc)—(phenyl) | bluish-red |
| 37 | —CH(CH₂OAc)—(phenyl) | bluish-red |
| 38 | —CH(CH₃)CH₂CH₂CH₂—C(CH₃)(CH₃)(OAc) | bluish-red |
| 39 | —CH(CH₂OAc)—CH(CH₃)(CH₃) | bluish-red |
| 40 | —C(CH₃)(CH₂OAc)(CH₂OAc) | bluish-red |
| 41 | —C(CH₃)(CH₃)(CH₂OAc) | bluish-red |

TABLE 2-continued

[Structure: similar anthracene chromophore]

| Example | R (Ac = C(=O)—CH₃) | Shade on polyester |
|---------|---------------------|---------------------|
| 42 | —CH(OAc)—CH(CH₂OH)—(phenyl) | bluish-red |
| 43 | —CH(CH₃)—CH(OAc)—(phenyl) | bluish-red |
| 44 | —CH(CH₂OAc)—CH₂—(phenyl) | bluish-red |
| 45 | —CH(CH₃)—CH₂OAc | bluish-red |
| 46 | —CH₂CH₂CH₂—OAc | bluish-red |

TABLE 3

[Structure: anthracene-based chromophore with NH—R, O, NC, CN, NH2]

| Example | R (Pr = C(=O)—C₂H₅) | Shade on polyester |
|---------|----------------------|---------------------|
| 47 | —CH₂—CH(OPr)—CH₂(OPr) | bluish-red |
| 48 | —CH₂—CH(OPr)—CH₃ | bluish-red |
| 49 | —(phenyl-CH₂OPr) | red-violet |

TABLE 3-continued

[Structure: anthraquinone-type with O, NH—R, NC, CN, NH₂ substituents]

| Example | R (Pr = C(=O)—C₂H₅) | Shade on polyester |
|---|---|---|
| 50 | —⟨C₆H₄⟩—CH₂OPr | red-violet |
| 51 | —⟨C₆H₄⟩—CH₂OPr | red-violet |
| 52 | —CH₂CH₂—⟨C₆H₄⟩—OPr | bluish-red |
| 53 | —CH₂CH₂—⟨C₆H₃⟩(OPr)(OPr) | bluish-red |
| 54 | —CH₂CH₂OPr | bluish-red |
| 55 | —CH(C₂H₅)CH₂OPr | bluish-red |
| 56 | —CH₂CH₂CH₂CH₂OPr | bluish-red |
| 57 | —⟨C₆H₄⟩—OPr (with H) | bluish-red |
| 58 | —CH₂—CH(OPr)—⟨C₆H₅⟩ | bluish-red |
| 59 | —CH(CH₂OPr)—⟨C₆H₅⟩ | bluish-red |
| 60 | —CH(CH₃)CH₂CH₂CH₂—C(CH₃)(CH₃)OPr | bluish-red |

TABLE 3-continued

[Structure: anthraquinone-type with O, NH—R, NC, CN, NH₂ substituents]

| Example | R (Pr = C(=O)—C₂H₅) | Shade on polyester |
|---|---|---|
| 61 | —CH(CH₂OPr)—CH(CH₃)(CH₃) | bluish-red |
| 62 | —C(CH₃)(CH₂OPr)(CH₂OPr) | bluish-red |
| 63 | —C(CH₃)(CH₃)CH₂OPr | bluish-red |
| 64 | —CH(CH₂OPr)—CH(OPr)—⟨C₆H₅⟩ | bluish-red |
| 65 | —CH(CH₃)—CH(OPr)—⟨C₆H₅⟩ | bluish-red |
| 66 | —CH(CH₂OPr)—CH₂—⟨C₆H₅⟩ | bluish-red |
| 67 | —CH(CH₃)CH₂OPr | bluish-red |
| 68 | —CH₂CH₂CH₂—OPr | bluish-red |

TABLE 4

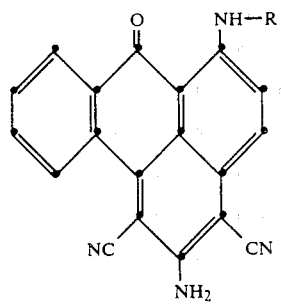

| Example | R (Bz = <img benzoyl >) | Shade on polyester |
|---|---|---|
| 69 | —CH₂—CH—CH₂ with OBz, OBz | bluish-red |
| 70 | —CH₂—CH—CH₃ with OBz | bluish-red |
| 71 | phenyl-CH₂OBz (para) | red-violet |
| 72 | phenyl-CH₂OBz (meta) | red-violet |
| 73 | phenyl-CH₂OBz | red-violet |
| 74 | —CH₂CH₂—phenyl—OBz | bluish-red |
| 75 | —CH₂CH₂—phenyl(OBz)(OBz) | bluish-red |
| 76 | —CH₂CH₂OBz | bluish-red |
| 77 | —CH(C₂H₅)(CH₂OBz) | bluish-red |
| 78 | —CH₂CH₂CH₂CH₂OBz | bluish-red |
| 79 | phenyl with H and OBz | bluish-red |

TABLE 4-continued

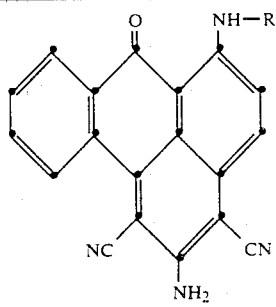

| Example | R (Bz = benzoyl) | Shade on polyester |
|---|---|---|
| 80 | —CH₂—CH(OBz)—phenyl | bluish-red |
| 81 | —CH(CH₂OBz)—phenyl | bluish-red |
| 82 | —CH(CH₃)—CH₂CH₂CH₂—C(CH₃)(CH₃)(OBz) | bluish-red |
| 83 | —CH(CH₂OBz)—CH(CH₃)(CH₃) | bluish-red |
| 84 | —C(CH₃)(CH₂OBz)(CH₂OBz) | bluish-red |
| 85 | —C(CH₃)(CH₃)(CH₂OBz) | bluish-red |
| 86 | —CH(OBz)—CH(CH₂OBz)—phenyl | bluish-red |
| 87 | —CH(CH₃)—CH(OBz)—phenyl | bluish-red |
| 88 | —CH(CH₂OBz)—CH₂—phenyl | bluish-red |
| 89 | —CH(CH₃)—CH₂OBz | bluish-red |

TABLE 4-continued

[Structure: anthraquinone-based with O, NH—R, NC, CN, NH₂ substituents]

| Example | R (Bz = C(=O)—phenyl) | Shade on polyester |
|---|---|---|
| 90 | —CH₂CH₂CH₂—OBz | bluish-red |

EXAMPLE 91

The procedure as described in Example 1 is repeated, except that an equivalent amount of 6-chloro-1-hydroxyisobutylaminoanthraquinone is used instead of 11.8 g of 1-hydroxyisobutylaminoanthraquinone, to give the dye of the formula

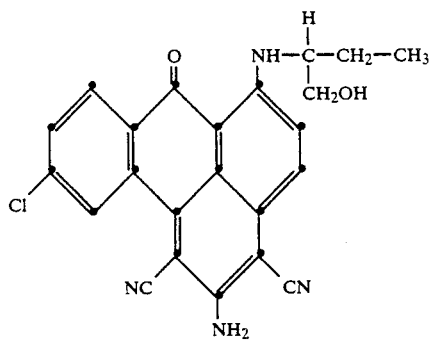

which dyes polyester in bluish red hues which have good fastness properties.

EXAMPLE 92

1 part of the dry, diluent-free dye according to Example 24 is mixed in a glass bead mill together with 1 part of dinaphthylmethanedisulfonate (Na salt) and water, and the mixture is milled until a particle size of about 2 μ or less has been obtained. 3 parts of sodium ligninsulfonate are then added to the resulting paste which consists of the dye, the dispersant and water. The paste obtained is then subjected to spray-drying to give a dye preparation in powder form.

This dye preparation can be used for the dyeing of polyester materials, for example by the HT process, in which the dye bath has good dispersion stability. This gives a bluish red polyester dyeing having good light fastness.

EXAMPLE 93

2 parts of the dye obtained according to Example 24 are dispersed in 4,000 parts of water. 12 parts of the sodium salt of o-phenylphenol and 12 parts of diammonium phosphate are added to this dispersion, and 100 parts of polyethylene glycol terephthalate yarn are dyed in this liquor at 95° to 98° for 90 minutes.

The dyeing is then rinsed and subsequently treated with aqueous sodium hydroxide solution and a dispersant. In this manner, a brilliant light and sublimation fast bluish red dyeing is obtained.

EXAMPLE 94

1 part of the dye obtained according to Example 24 is melted while wet 2 parts of a 50% aqueous solution of the sodium salt of dinaphthylmethanedisulfonic acid, and the mixture is dried.

This dye preparation is stirred with 40 parts of a 10% aqueous solution of the sodium salt of N-benzylheptadecylbenzimidazoledisulfonic acid, and 4 parts of a 40% acetic acid solution are added to the mixture. Dilution of this mixture with water gives a dye bath of 4,000 parts.

This bath is entered at 50° with 100 parts of a polyester fiber material, the temperature is raised to 120° to 130° over a period of half an hour, and the material is dyed at this temperature in a closed vessel for one hour. It is then thoroughly rinsed. This gives a brilliant bluish red dyeing having good light fastness.

EXAMPLE 95

A polyethylene glycol terephthalate fabric is impregnated at 40° on a pad-mangle by means of a liquor of the following composition:
20 parts of the dye obtained according to Example 24 finely dispersed in
10 parts of sodium alginate,
20 parts of triethanolamine,
20 parts of octylphenol polyglycol ether and
930 parts of water.

The fabric squeezed off to a liquor pickup of about 100% is dried at 100° and subsequently fixed at a temperature of 210° for 30 seconds. The dyed material is rinsed with water, soaped and dried. This gives a brilliant light fast bluish red dyeing.

EXAMPLE 96

Non-delustred polyethylene terephthalate granules which are suitable for fiber production are shaken in a sealable vessel for 15 minutes together with 1% of the dye according to Example 24 on a vibrating machine. The uniformly dyed granule particles are spun on a melt spinning plant (285° C.±3°, residence time in the spinning plant about 5 minutes) to give threads which are drawn on a draw-twisting machine and wound up. This gives a brilliant bluish red dyeing which is distinguished by excellent light fastness and sublimation fastness.

What is claimed is:

1. A compound of the formula

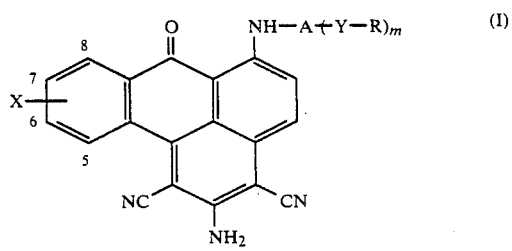

in which X is hydrogen, halogen, nitro, $NH_2$, Y is —O— or —S—, A is an aliphatic, aromatic or araliphatic bridge member, m is 1, 2 or 3, R is hydrogen or a radical

in which R¹ is a substituted or unsubstituted alkyl or aryl group, with the proviso that if R is hydrogen, Y is oxygen and X is hydrogen or halogen bound to the 6 or 7 position of the benzanthrone ring, A as aliphatic bridge member is limited to a $C_2$–$C_5$ aliphatic bridge member.

2. A compound according to claim 1 in which X is hydrogen.

3. A compound according to claim 1 in which Y is —O—.

4. A compound according to claim 1 in which R is a radical

5. A compound according to claim 1 in which R¹ is $C_1$–$C_6$ alkyl, which is unsubstituted or substituted by phenyl or phenoxy, where the phenyl group in the two lastmentioned radials can be substituted by $C_1$–$C_4$ alkyl, $C_1$–$C_4$ alkoxy or phenoxy, or is phenyl, which is unsubstituted or substituted by $C_1$–$C_4$ alkyl.

6. A compound according to claim 5 in which R¹ is $C_1$–$C_3$ alkyl or phenyl.

7. A compound according to claim 1 in which m is 1 or 2, in particular 1.

8. A compound according to claim 1 in which A is a $C_2$–$C_5$ alkylene radical or a phenylene-$C_2$–$C_5$ alkylene radical.

9. A compound of the formula

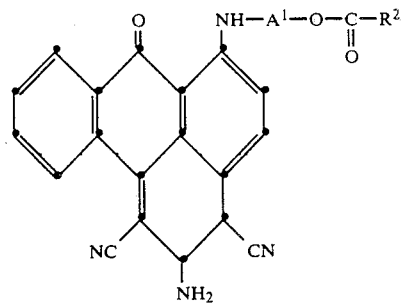

in which A¹ is a $C_2$–$C_5$ alkylene radical or a phenylene-$C_2$–$C_5$ alkylene radical and R² is $C_1$–$C_3$ alkyl or phenyl.

10. A process for the preparation of the compounds of the formula (1) according to claim 1, which comprises reacting a substituted aminoanthraquinone of the formula

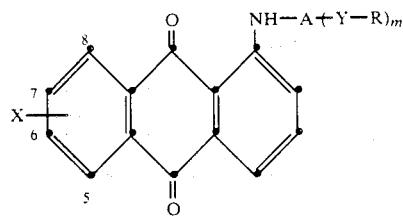

in which X, Y, A, m and R are as defined in formula (1) with malodinitrile in an inert solvent in the presence of titanium tetrachloride and a tertiary amine.

11. A compound according to claim 1 selected from the group consisting of

-continued
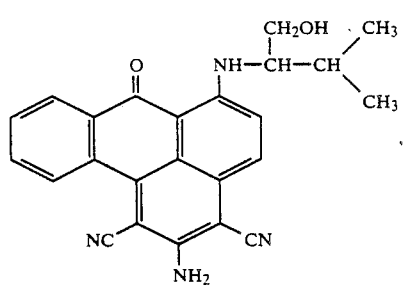
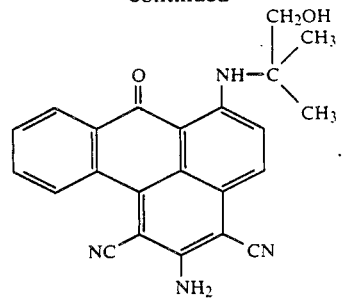
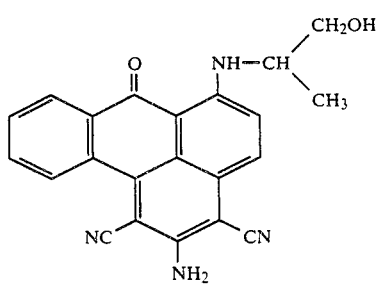 and
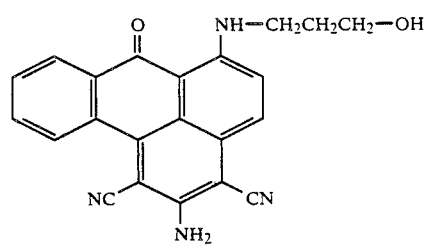
* * * * *